(12) United States Patent
Zou et al.

(10) Patent No.: US 11,940,707 B2
(45) Date of Patent: Mar. 26, 2024

(54) HIGH-SPEED AND LOW-VOLTAGE ELECTRO-OPTICAL MODULATOR BASED ON LITHIUM NIOBATE-SILICON WAFER

(71) Applicant: Shanghai Jiao Tong University, Shanghai (CN)

(72) Inventors: Weiwen Zou, Shanghai (CN); Jing Wang, Shanghai (CN); Shaofu Xu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 293 days.

(21) Appl. No.: 17/547,124

(22) Filed: Dec. 9, 2021

(65) Prior Publication Data

US 2022/0100048 A1     Mar. 31, 2022

Related U.S. Application Data

(63) Continuation of application No. PCT/CN2020/080124, filed on Mar. 19, 2020.

(30) Foreign Application Priority Data

Feb. 24, 2020 (CN) .......................... 202010111302.1

(51) Int. Cl.
    *G02F 1/21*         (2006.01)
    *G02F 1/225*       (2006.01)

(52) U.S. Cl.
    CPC .............. *G02F 1/212* (2021.01); *G02F 1/217* (2021.01); *G02F 1/225* (2013.01); *G02F 2202/20* (2013.01)

(58) Field of Classification Search
    CPC ........... G02F 1/212; G02F 1/225; G02F 1/217
    See application file for complete search history.

(56) References Cited

U.S. PATENT DOCUMENTS

| 2012/0106888 A1 | 5/2012 | Goh et al. |
| 2015/0043867 A1* | 2/2015 | Kono ...................... G02F 1/025 438/31 |

(Continued)

FOREIGN PATENT DOCUMENTS

| CN | 103048733 A | 4/2013 |
| CN | 208060765 U | 11/2018 |

(Continued)

OTHER PUBLICATIONS

Wang, Cheng, et al., "Integrated lithium niobate electro-optical modulators operating at CMOS-compatible voltages," Nature, vol. 562, pp. 101-104 (total 12 pages) (Oct. 4, 2018).

(Continued)

*Primary Examiner* — Tina M Wong
(74) *Attorney, Agent, or Firm* — Mei & Mark LLP; Manni Li

(57) ABSTRACT

A high-speed and low-voltage electro-optical modulator based on a lithium niobate-silicon wafer. A silicon wafer is located above a lithium niobate wafer; a lithium niobate-silicon hybrid waveguide is formed by etching a silicon waveguide; and the power of light waves is differently distributed in the lithium niobate-silicon hybrid waveguide by changing the structure of the silicon waveguide. When higher power is distributed in the silicon waveguide, the high-speed and low-voltage electro-optical modulator is suitable for realizing a compact wave splitting function, a wave combining function and a thermo-optical modulation function; and when higher power is distributed in the lithium niobate waveguide, the high-speed and low-voltage electro-optical modulator is suitable for realizing a high-speed and low-voltage electro-optical modulation function. The present invention takes advantage of the lithium niobate and (Continued)

silicon material platforms respectively, and is suitable for high-speed and low-voltage electro-optical modulation.

4 Claims, 2 Drawing Sheets

(56) References Cited

U.S. PATENT DOCUMENTS

| | | | |
|---|---|---|---|
| 2015/0277043 A1* | 10/2015 | Shimizu | G02B 6/12004 438/31 |
| 2018/0364416 A1 | 12/2018 | Li et al. | |
| 2021/0041726 A1* | 2/2021 | Katsuyama | G02F 1/2257 |

FOREIGN PATENT DOCUMENTS

| | | |
|---|---|---|
| CN | 109613723 A | 4/2019 |
| CN | 110187526 A | 8/2019 |
| JP | 5421935 B2 | 11/2013 |

OTHER PUBLICATIONS

Weigel, Peter O., et al., "Bonded thin film lithium niobate modulator on a silicon photonics platform exceeding 100 GHz 3-dB electrical modulation bandwidth," Optics express, vol. 26, No. 18, pp. 23728-23739 (Sep. 3, 2018).

Jin, Shilei, et al., "$LiNbO_3$ thin-film modulators using silicon nitride surface ridge waveguides," IEEE Photonics Technology Letters, vol. 28, No. 7, pp. 736-739 (Apr. 1, 2016).

\* cited by examiner

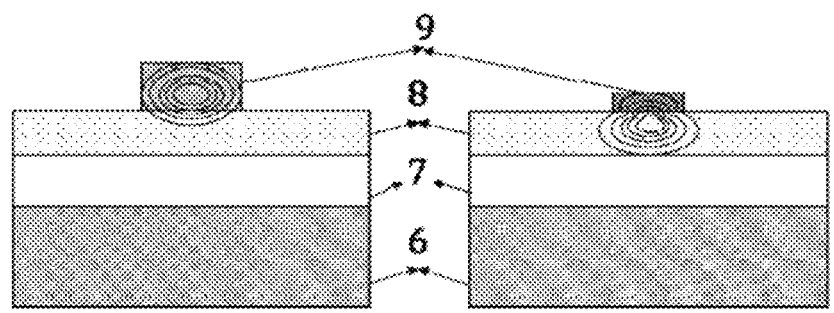
FIG. 3A  FIG. 3B
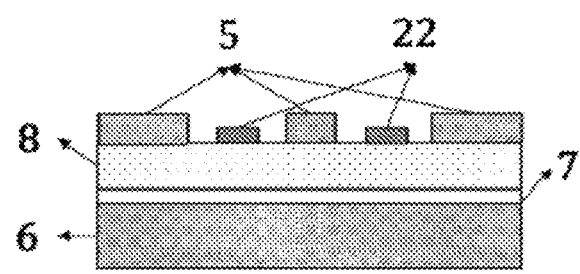
FIG. 4

HIGH-SPEED AND LOW-VOLTAGE ELECTRO-OPTICAL MODULATOR BASED ON LITHIUM NIOBATE-SILICON WAFER

CROSS-REFERENCE TO RELATED APPLICATIONS

The subject application is a continuation of PCT/CN2020/080124 filed on Mar. 19, 2020, which claims priority on Chinese Application No. 202010111302.1 filed Feb. 24, 2020 in China. The contents and subject matter of the PCT international application and Chinese priority application are incorporated herein by reference.

TECHNICAL FIELD

The present invention relates to photonic heterogeneous integration, and particularly, a high-speed and low-voltage electro-optical modulator based on a lithium niobate-silicon wafer.

BACKGROUND ART

An electro-optical modulator plays an important role in optical communications and is used for loading electrical signals onto optical signals, thereby, to realize the transmission and processing of signals in the optical domain. Silicon modulators which are prepared on silicon wafers by using a complementary metal oxide semiconductor integration technology are the most common modulators in optical signal processing systems. However, with the development of optical communication technologies, silicon modulators have been unable to meet the requirements of high speed, low voltage, low loss, etc. In recent years, thanks to the development of lithium niobate film fabrication technologies, by replacing the silicon modulators with lithium niobate modulators, the modulation bandwidth of the modulator is further increased, and the voltage and the loss of the modulator are reduced. The working principle of thin-film lithium niobate modulators is to utilize the linear electro-optical effect of the lithium niobate waveguide, that is, under the action of an external electric field, the refractive index of the lithium niobate waveguide changes, and then phase modulation or intensity modulation are completed.

There are two existing modulation methods using lithium niobate waveguides. According to one existing modulation method using the lithium niobate waveguide, a lithium niobate wafer is etched to form a pure thin-film lithium niobate modulator with a ridge-type lithium niobate waveguide (See, Wang, Cheng, et al. "Integrated lithium niobate electro-optical modulators operating at CMOS-compatible voltages." Nature 562.7725 (2018): 101), and the ridge-type lithium niobate waveguide is used to confine the transmission of light waves. According to the other existing modulation method using the lithium niobate waveguide, a silicon-lithium niobate waveguide modulator (See Weigel, Peter O., et al. "Bonded thin film lithium niobate modulator on a silicon photonics platform exceeding 100 GHz 3-dB electrical modulation bandwidth." Optics express 26.18 (2018): 23728-23739) or a silicon nitride-lithium niobate waveguide modulator (See Jin, Shilei, et al. "LiNbO 3 thin-film modulators using silicon nitride surface ridge waveguides." IEEE Photonics Technology Letters 28.7 (2015): 736-739) uses silicon waveguides or silicon nitride waveguides to guide the transmission of light waves, and meanwhile, the light waves bound in the lithium niobate waveguide is subjected to electro-optical modulation. With the emergence of the system-on-a-chip, the use of heterogeneous integration technologies can take advantage of various materials, and enables silicon to be combined with other materials to achieve multi-functional photonic device integration. Therefore, the second type of modulator implements high-speed, low-voltage electro-optical modulation in the system-on-a-chip, thereby improving the performance of the system-on-chip.

SUMMARY OF THE INVENTION

To solve the problem in the existing technology, the present invention provides a high-speed and low-voltage electro-optical modulator based on the lithium niobate-silicon wafer. The modulator changes the power fraction of light waves in a silicon waveguide or a lithium niobate waveguide, which utilizes the advantages of the silicon waveguide and the lithium niobate waveguide. The silicon waveguide has a large refractive index, and the compactness of the modulator is realized, at the same time, the lithium niobate waveguide has a relatively large electro-optical coefficient, and the electro-optical modulation is realized. In addition, the high-speed and low-voltage electro-optical modulator based on the lithium niobate-silicon wafer utilizes the lithium niobate-silicon wafer and a mature silicon photonic integration technology; the silicon wafer is located above the lithium niobate wafer; and the lithium niobate-silicon hybrid waveguide is formed by etching the silicon wafer to control the transmission of light waves, while the etching of the lithium niobate wafer is avoided.

The technical solution of the present invention is as follows.

The high-speed and low-voltage electro-optical modulator with the Mach-Zehnder interference structure based on the lithium niobate-silicon wafer is characterized in that the high-speed and low-voltage electro-optical modulator with the Mach-Zehnder interference structure based on the lithium niobate-silicon wafer comprises a silicon substrate layer, a silicon dioxide isolation layer, a lithium niobate wafer layer and a silicon waveguide layer from bottom to top, the silicon waveguide layer is etched to form multimode interferometers, thermal modulation phase shifters, spot-size converters, electrical modulation phase shifters, DC bias electrodes and traveling-wave electrodes. A high refractive index region, a spot-size conversion region, an electro-optical modulation region, a spot-size conversion region, and a high refractive index region are sequentially formed from an input end to an output end, the multimode interferometers and the thermal modulation phase shifters are located in the high refractive index regions, the spot-size converters are located in the spot-size conversion regions, and the electrical modulation phase shifters are located in the electro-optical modulation region; and the multimode interferometers, the thermal modulation phase shifters, the spot-size converters and the electrical modulation phase shifters constitute a waveguide structure component, the DC bias electrodes are formed near the thermal modulation phase shifters, and the traveling-wave electrodes are formed near the electrical modulation phase shifters.

In the present invention, the modulator structure component comprises the two multimode interferometers, the four spot-size converters, the two thermal modulation phase shifters, the two electrical modulation phase shifters, the DC bias electrodes and the traveling-wave electrodes, the two multimode interferometers respectively serve as a multiplexer and a demultiplexer, two output ports of the multiplexer are respectively connected to ends of the two thermal modulation phase shifters, the other ends of the two thermal modulation phase shifters are respectively connected to ends of the two spot-size converters, the other ends of the two spot-size converters are respectively connected to ends of the two electrical modulation phase shifters, the other ends of the two electrical modulation phase shifters are respectively connected to ends of the other two spot-size converters, and the other ends of the two spot-size converters are connected to the multiplexer.

In the present invention, the spot-size converters can be realized through single-layer tapered couplers or double-layer tapered couplers.

In the present invention, the waveguide structure component comprises the multimode interferometer, the thermal modulation phase shifters, the spot-size converters, the electrical modulation phase shifters and the multimode interferometer in sequence.

In the present invention, the waveguide structure component comprises the multimode interferometers, the spot-size converters, the electrical modulation phase shifters and the multimode interferometer in sequence.

In the present invention, the high-speed and low-voltage electro-optical modulator based on the lithium niobate-silicon wafer is characterized in that the high refractive index region, the spot-size conversion region, the electro-optical modulation region, the spot-size conversion region, and the high refractive index region are sequentially formed from the input end to the output end.

In the present invention, in the high refractive index regions, most of the power of light waves is located in the silicon waveguide; in the spot-size conversion regions, the power of the light waves is transferred from the silicon waveguide to the lithium niobate waveguide; and in the electro-optical modulation region, most of the power of the light waves is located in the lithium niobate waveguide so as to perform electro-optical modulation.

The technical effects of the present invention are as follows:

According to the high-speed and low-voltage electro-optical modulator with the Mach-Zehnder interference structure based on the lithium niobate-silicon wafer, the power of the light waves is differently distributed in the lithium niobate-silicon hybrid waveguide by changing the structure of the silicon waveguide. When higher power is distributed in the silicon waveguide, the high-speed and low-voltage electro-optical modulator with the Mach-Zehnder interference structure based on the lithium niobate-silicon wafer is suitable for realizing a compact wave splitting function, a wave combining function and a thermo-optic modulation function; when higher power is distributed in the lithium niobate waveguide, the high-speed and low-voltage electro-optical modulator with the Mach-Zehnder interference structure based on the lithium niobate-silicon wafer is suitable for realizing a high-speed and low-voltage electro-optical modulation function.

In the high refractive index regions, most of the power of the light waves is located in the silicon waveguide; in the spot-size conversion regions, the power of the light waves is transferred from the silicon waveguide to the lithium niobate waveguide; and in the electro-optical modulation region, most of the power of the light waves is located in the lithium niobate waveguide so as to perform electro-optical modulation.

In the present invention, the high-speed and low-voltage electro-optical modulator with the Mach-Zehnder interference structure based on the lithium niobate-silicon wafer changes the power of the light waves in the silicon waveguide and the lithium niobate waveguide, and has the advantages that the silicon waveguide has a large refractive index, the compactness of the modulator is realized, at the same time, the lithium niobate waveguide has a relatively large electro-optical coefficient, and the electro-optical modulation is realized.

In the present invention, the high-speed and low-voltage electro-optical modulator with the Mach-Zehnder interference structure based on the lithium niobate-silicon wafer utilizes the lithium niobate-silicon wafer and a mature silicon photonic integration technology; the silicon wafer is located above the lithium niobate wafer; and the lithium niobate-silicon hybrid waveguide is formed by etching the silicon wafer to control the transmission of light waves, and at the same time, the etching of the lithium niobate wafer is avoided.

BRIEF DESCRIPTION OF THE DRAWINGS

FIGS. 1A and 1B are show the structure of the high-speed and low-voltage electro-optical modulator based on the lithium niobate-silicon wafer provided in the present invention, wherein FIG. 1A is a top view, and FIG. 1B is a sectional view.

FIGS. 2A, 2B, and 2C show structure of the spot-size converter 3 of the present invention, wherein FIG. 2A is a three-dimensional structure diagram, FIG. 2B is a sectional view, and FIG. 2C is a top view.

FIGS. 3A and 3B show the power distribution of light waves at the input port and output port of the spot-size converter of the present invention, that is, a schematic diagram of the mode field distribution, wherein FIG. 3A is the mode field distribution diagram of most of the power of light waves in a silicon waveguide, and FIG. 3B is the mode field distribution diagram of most of the power of light waves in a lithium niobate waveguide.

FIG. 4 is a transverse sectional view of the present invention in the electro-optical modulation region.

DETAILED DESCRIPTION OF THE INVENTION

The present invention is described in detail below with reference to the drawings and embodiments, and detailed implementation and structure are given, but the protection scope of the present invention is not limited to the following embodiments.

Figure 1A:
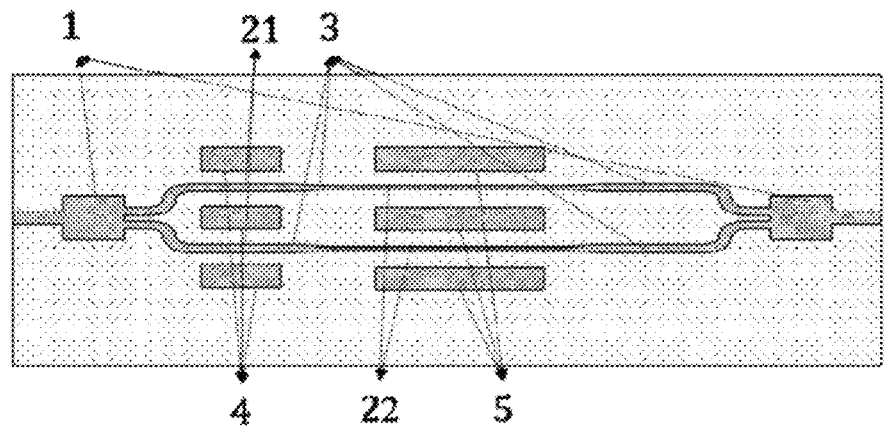
Figure 1B:
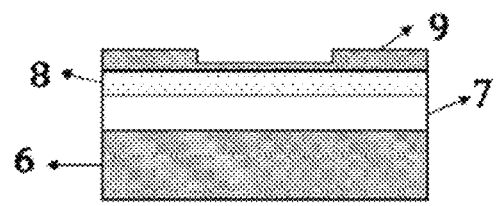

FIGS. 1A and 1B show the electro-optical modulator with a Mach-Zehnder interference structure provided by the present invention. It can be seen from the top view of FIG. 1A that the electro-optical modulator provided by the present invention is located on the same lithium niobate-silicon wafer, and structurally comprises multimode interferometers 1, a phase shifting arm 2, spot-size converters 3, DC bias electrodes 4, traveling-wave electrodes 5, and the like, wherein the phase shifting arm 2 comprises thermal modulation phase shifters 21 and electrical modulation phase shifters 22. The multimode interferometers 1, the thermal modulation phase shifters 21 and the DC bias electrodes 4 are located in the high refractive index region; the spot-size converters 3 are located in the spot-size conversion regions; the electrical modulation phase shifters 22 and the traveling-wave electrodes 5 are located in the electro-optical modulation region; and it can be seen from the sectional view in FIG. 1B that the electro-optical modulator provided by the present invention comprises a silicon substrate layer 6, a silicon dioxide isolation layer 7, a lithium niobate wafer layer 8, and a silicon waveguide layer 9 from bottom to top. The silicon waveguide layer 9 is etched to form the multimode interferometers 1, the phase shifting arm 2 and the spot-size converters 3.

Figure 2A:
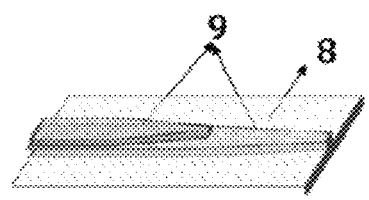
Figure 2B:
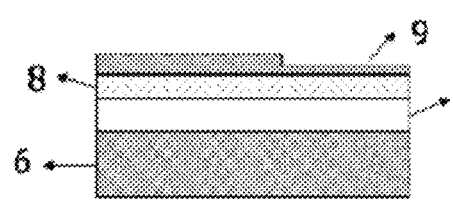
Figure 2C:
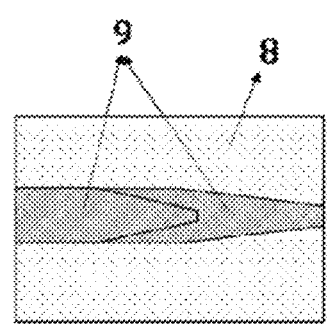

FIGS. 2A, 2B, and 2C show the structure of the spot-size converter 3 of the present invention. It can be seen from the three-dimensional structure diagram of FIG. 2A that the spot-size converter 3 of the present invention comprises two layers of tapered couplers; it can be seen from the sectional view of FIG. 2B that an input end and an output end of the spot-size converter of the present invention have different waveguide thicknesses; and it can be seen from the top view in FIG. 2C that the input end and the output end of the spot-size converter 3 of the present invention have different waveguide widths.

FIGS. 3A and 3B show the power distribution of light waves at the input port and output port of the spot-size conversion region of the high-speed and low-voltage electro-optical modulator based on the lithium niobate-silicon wafer, that is, a schematic diagram of the mode field distribution; and it can be seen from the schematic diagram of the optical field distribution that most of the light waves bound in the silicon waveguide are transmitted to the lithium niobate waveguide through the spot-size converters.

FIG. 4 is a longitudinal sectional view of the present invention in the electro-optical modulation region. The electro-optical modulator provided by the present invention comprises the silicon substrate layer 6, the silicon dioxide isolation layer 7, the lithium niobate wafer layer 8, the silicon waveguide layer 9 and the traveling-wave electrodes 5 from bottom to top, wherein the electrical modulation phase shifters 4 are located between the traveling-wave electrodes 5.

In the first embodiment, the basic structure of the present invention is a Mach-Zehnder modulator. The Mach-Zehnder modulator comprises two the multimode interferometers 1, the two spot-size converters 3, the two thermal modulation phase shifters 21, the two electrical modulation phase shifters 22, and the DC bias electrodes 4 and the traveling-wave electrodes 5. The multimode interferometer is a 1×2 multimode interferometer, and the two multimode interferometers 1 respectively serve as a multiplexer and a demultiplexer. Two output ports of the multiplexer are respectively connected to the two thermal modulation phase shifters 21, and the two thermal modulation phase shifters 21 are respectively connected to ends of the two spot-size converters 3, the other ends of the two spot-size converters 3 are respectively connected to the two electrical modulation phase shifters 22, the two electrical modulation phase shifters 22 are respectively connected to the two spot-size converters, and the two spot-size converters 3 are finally connected to the multiplexer. The DC bias electrodes 4 are formed near the thermal modulation phase shifters 21, and the traveling-wave electrodes 5 are formed near the electrical modulation phase shifters 22. The high-speed and low-voltage electro-optical modulator with the Mach-Zehnder interference structure based on the lithium niobate-silicon wafer has the greatest characteristic that there is a silicon wafer on the lithium niobate wafer, and the silicon wafer is etched through a mature complementary metal oxide integration process to form a lithium niobate-silicon hybrid waveguide. By controlling the etching width and the etching depth of the silicon waveguide, the light waves can be transmitted in the silicon waveguide and the lithium niobate waveguide.

In the second embodiment of the present invention, regarding the bias point control method of the high-speed and low-voltage modulator, in the embodiment of the present invention, the thermal modulation phase shifters 21 are located in the high refractive index regions, and are used for the bias point control of the high-speed and low-voltage modulator. Therefore, from one port of the modulator to the other port of the modulator, a waveguide structure component comprises the multimode interferometer 1, the thermal modulation phase shifters 21, the spot-size converters 3, the electrical modulation phase shifters 22, and the multimode interferometer 1.

In the third embodiment of the present invention, the thermal modulation phase shifters 21 are located in the low refractive index region, and are used for the bias point control of the high-speed and low-voltage modulator. Therefore, from one port of the modulator to the other port of the modulator, the waveguide structure component respectively comprises the multimode interferometer 1, the spot-size converters 3, the thermal modulation phase shifters 21, the electrical modulation phase shifters 22, and the multimode interferometer 1.

In the fourth embodiment of the present invention, the electrical modulation phase shifters are used for the bias point control of the high-speed and low-voltage modulator. Therefore, from one port of the modulator to the other port of the modulator, the waveguide structure component comprises the multimode interferometer 1, the spot-size converters 3, the electrical modulation phase shifters 22, and the multimode interferometer 1.

Regarding the spot-size conversion method, in this embodiment of the present invention, as the silicon waveguide has different etching widths and heights in the high refractive index regions and the electro-optical modulation region, the two-layered tapered couplers are used as the spot-size converters 3 for the transfer and transmission of light waves. In other embodiments of the present invention, the silicon waveguides in the high refractive index regions and the electro-optical modulation region have the same etching width, so that the single-layer tapered couplers can be used as the spot-size converters 3 for the transfer and transmission of the light waves.

We claim:
1. A high-speed and low-voltage electro-optical modulator with a Mach-Zehnder interference structure based on a lithium niobate-silicon wafer, comprising, as arranged from bottom to top,
  a silicon substrate layer,
  a silicon dioxide isolation layer,
  a lithium niobate wafer layer, and
  a silicon waveguide layer,
  wherein the silicon waveguide layer is etched to form multimode interferometers, a phase shifting arm, spot-size converters, DC bias electrodes, and traveling-wave electrodes;
  a high refractive index region, a spot-size conversion region, an electro-optical modulation region, a spot-size conversion region, and a high refractive index region are sequentially formed from an input end to an output end;
  the phase shifting arm comprises thermal modulation phase shifters and electrical modulation phase shifters;
  the multimode interferometers and the thermal modulation phase shifters are located in the high refractive index regions;
  the spot-size converters are located in the spot-size conversion region, and the electrical modulation phase shifters are located in the electro-optical modulation region;

the multimode interferometers, the phase shifting arm, and the spot-size converters constitute a waveguide structure component;

the DC bias electrodes are formed near the thermal modulation phase shifters; and the traveling-wave electrodes are formed near electrical modulation phase shifters.

2. The high-speed and low-voltage electro-optical modulator with the Mach-Zehnder interference structure based on the lithium niobate-silicon wafer according to claim 1, wherein the waveguide structure component comprises the two multimode interferometers,
the four spot-size converters,
the two thermal modulation phase shifters,
the two electrical modulation phase shifters,
the DC bias electrodes and the traveling-wave electrodes,
wherein the two multimode interferometers respectively serve as a multiplexer and a demultiplexer;

two output ports of the multiplexer are respectively connected to ends of the two thermal modulation phase shifters, and the other ends of the two thermal modulation phase shifters are respectively connected to ends of the two spot-size converters, the other ends of the two spot-size converters are respectively connected to ends of the two electrical modulation phase shifters, the other ends of the two electrical modulation phase shifters are respectively connected to ends of the other two spot-size converters, and the other ends of the two spot-size converters are connected to the multiplexer.

3. The high-speed and low-voltage electro-optical modulator with the Mach-Zehnder interference structure based on the lithium niobate-silicon wafer according to claim 1, wherein the spot-size converters are realized through single-layer tapered couplers or double-layer tapered couplers.

4. The high-speed and low-voltage electro-optical modulator with the Mach-Zehnder interference structure based on the lithium niobate-silicon wafer according to claim 1, wherein the waveguide structure component comprises, sequentially, the first multimode interferometer,
the thermal modulation phase shifters,
the spot-size converters,
the electrical modulation phase shifters, and
the second multimode interferometer.

\* \* \* \* \*